United States Patent
Edson et al.

(10) Patent No.: US 8,161,402 B1
(45) Date of Patent: Apr. 17, 2012

(54) METHODS AND APPARATUS FOR GRAPHICAL TEST AND MEASUREMENT

(75) Inventors: Patrick L. Edson, Newton, MA (US); Melissa J. Pike, Milford, MA (US)

(73) Assignee: The MathWorks, Inc., Natick, MA (US)

( * ) Notice: Subject to any disclaimer, the term of this patent is extended or adjusted under 35 U.S.C. 154(b) by 958 days.

(21) Appl. No.: 10/809,152

(22) Filed: Mar. 24, 2004

(51) Int. Cl.
 - *G06F 3/048* (2006.01)
 - *G06F 3/00* (2006.01)
 - *G06F 11/30* (2006.01)
 - *G21C 17/00* (2006.01)

(52) U.S. Cl. ............. 715/771; 710/1; 702/182; 702/186

(58) Field of Classification Search .................. 715/771; 710/1; 702/182, 186

See application file for complete search history.

(56) References Cited

U.S. PATENT DOCUMENTS

| | | | | |
|---|---|---|---|---|
| 5,986,653 | A * | 11/1999 | Phathayakorn et al. | 715/835 |
| 6,185,491 | B1 * | 2/2001 | Gray et al. | 701/36 |
| 7,043,393 | B2 * | 5/2006 | Fuller et al. | 702/127 |
| 7,467,372 | B2 * | 12/2008 | Loughlin et al. | 717/106 |
| 8,010,702 | B2 * | 8/2011 | Farouk | 709/246 |
| 2002/0174209 | A1 * | 11/2002 | Sesek et al. | 709/223 |
| 2003/0001896 | A1 * | 1/2003 | Johnson et al. | 345/771 |
| 2003/0004670 | A1 * | 1/2003 | Schmit et al. | 702/123 |
| 2003/0033398 | A1 * | 2/2003 | Carlson et al. | 709/223 |
| 2003/0035008 | A1 * | 2/2003 | Fuller et al. | 345/771 |
| 2003/0056018 | A1 * | 3/2003 | Pike et al. | 709/310 |
| 2003/0083756 | A1 * | 5/2003 | Hsiung et al. | 700/28 |
| 2003/0103080 | A1 * | 6/2003 | Radjabi | 345/763 |
| 2003/0184596 | A1 * | 10/2003 | Kodosky et al. | 345/810 |
| 2004/0027392 | A1 * | 2/2004 | Dunn et al. | 345/810 |
| 2004/0032429 | A1 * | 2/2004 | Shah et al. | 345/771 |
| 2004/0109017 | A1 * | 6/2004 | Rothman et al. | 345/735 |
| 2005/0235221 | A1 * | 10/2005 | Asoh et al. | 715/789 |

* cited by examiner

*Primary Examiner* — Chat Do
*Assistant Examiner* — Stephen Alvesteffer
(74) *Attorney, Agent, or Firm* — Nelson Mullins Riley & Scarborough LLP

(57) ABSTRACT

A graphical interface is provided to manage interfaces with hardware and software devices. The graphical communication interface can be operated on an electronic device to simplify management of one or more interfaces, while providing opportunities for enhanced capabilities and control of the interfaces. The graphical communication interface can create objects that are associated with hardware or software devices. The objects are representative of the device and are depicted in the graphical interface. The object is configured to be interactive with the device and enable communication between the graphical interface and the hardware device. The graphical interface can include both software objects and hardware objects and the objects can include user-defined protocols to communicate with the device, allowing communications with a wide variety of devices. Analysis objects may also be created for interaction with the hardware objects or software objects.

48 Claims, 8 Drawing Sheets

METHODS AND APPARATUS FOR GRAPHICAL TEST AND MEASUREMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to interactive test and/or measurement environments and more particularly to methods and systems for controlling interactive test and/or measurement environments.

BACKGROUND OF THE INVENTION

Computers may include software tools that run on the computers and perform desired functions. For example, computers may include software tools that provide programming environments. The programming tools enable users to create programs that can be executed on the computers to perform specific functions designed by the users. The programming tools may provide textual and graphical environments for generating the programs. MATLAB® and Simulink®, both from The MathWorks Inc. of Natick, Mass., are exemplary software tools that provide textual and graphical programming environments, respectively. MATLAB® integrates mathematical computing, visualization, and a powerful language to provide a flexible environment for technical computing. Simulink® enables users to design a block diagram for a target system, simulate the system's behavior, analyze the performance of the system, and refine the design of the system. Computers may also include software tools that provide other functions, such as reading/writing data from/to external devices. MATLAB® Toolboxes, from The MathWorks Inc. of Natick, Mass., provide exemplary software tools that enable the computers to perform a plurality of functions, including interfacing with the external devices.

The fields of Test & Measurement and Industrial Automation often involve interfacing with hardware devices, such as external devices, in the form of instruments or other devices from which data is imported into the software environment. Historically, because of a wide variety of instruments and protocols for communication for hardware devices, establishing and maintaining an interface to many types of hardware devices has resulted in an inordinate amount of effort on the part of the user and/or very limited interface capabilities available to the user. Oftentimes, even if an interface to one hardware device is established, difficulties can arise in establishing additional interfaces or organizing several interfaces for the many hardware devices that may be accessible to a computer.

SUMMARY OF THE INVENTION

The present invention provides a graphical interface capable of indicating available hardware and software devices. The present invention can also provide opportunities for enhanced control and simplified operation of hardware and software devices accessible to an electronic device, such as a computer. Such devices may include a wide variety of hardware and software devices. The graphical communication interface can create objects that are associated with hardware or software devices. The objects are representative of the device and are depicted in the graphical interface. The objects are configured to be interactive with the device and enable communication between the graphical interface and the hardware device. The graphical interface can include both software objects and hardware objects, and the objects can include user-defined protocols to communicate with the device, allowing communications with a wide variety of devices.

According to one embodiment of the invention, a method is provided having the steps of providing a graphical interface and providing at least one hardware object. The hardware object is representative of a hardware device and is depicted in the graphical interface. The hardware object is configured to be interactive with the hardware device and to enable communication between the graphical interface and the hardware device. A software object and/or an analysis object is also be provided. The software object is representative of a software device and is depicted in the graphical interface. The software object is configured to be interactive with the software device and to enable communication between the graphical interface and the software device. The analysis object is adapted to communicate with the hardware object and/or the software object. Optionally, a medium may be provided holding electronic device executable steps for the methods of the invention.

BRIEF DESCRIPTION OF THE DRAWINGS

The invention will be apparent from the description herein and the accompanying drawings, in which like reference characters refer to the same parts throughout the different views.

DETAILED DESCRIPTION

An illustrative embodiment of the present invention provides a graphical interface for managing interfaces with hardware and software devices in a measurement system. The graphical interface provides a view of hardware objects that represent the hardware devices and software objects that represent the software devices. Analysis objects may also be displayed via the graphical interface. The analysis objects represent analyses that may be performed relative to the hardware and software objects. The graphical interface can be operated on an electronic device to simplify management of one or more interfaces of hardware and/or software devices located locally or remotely.

Figure 1:
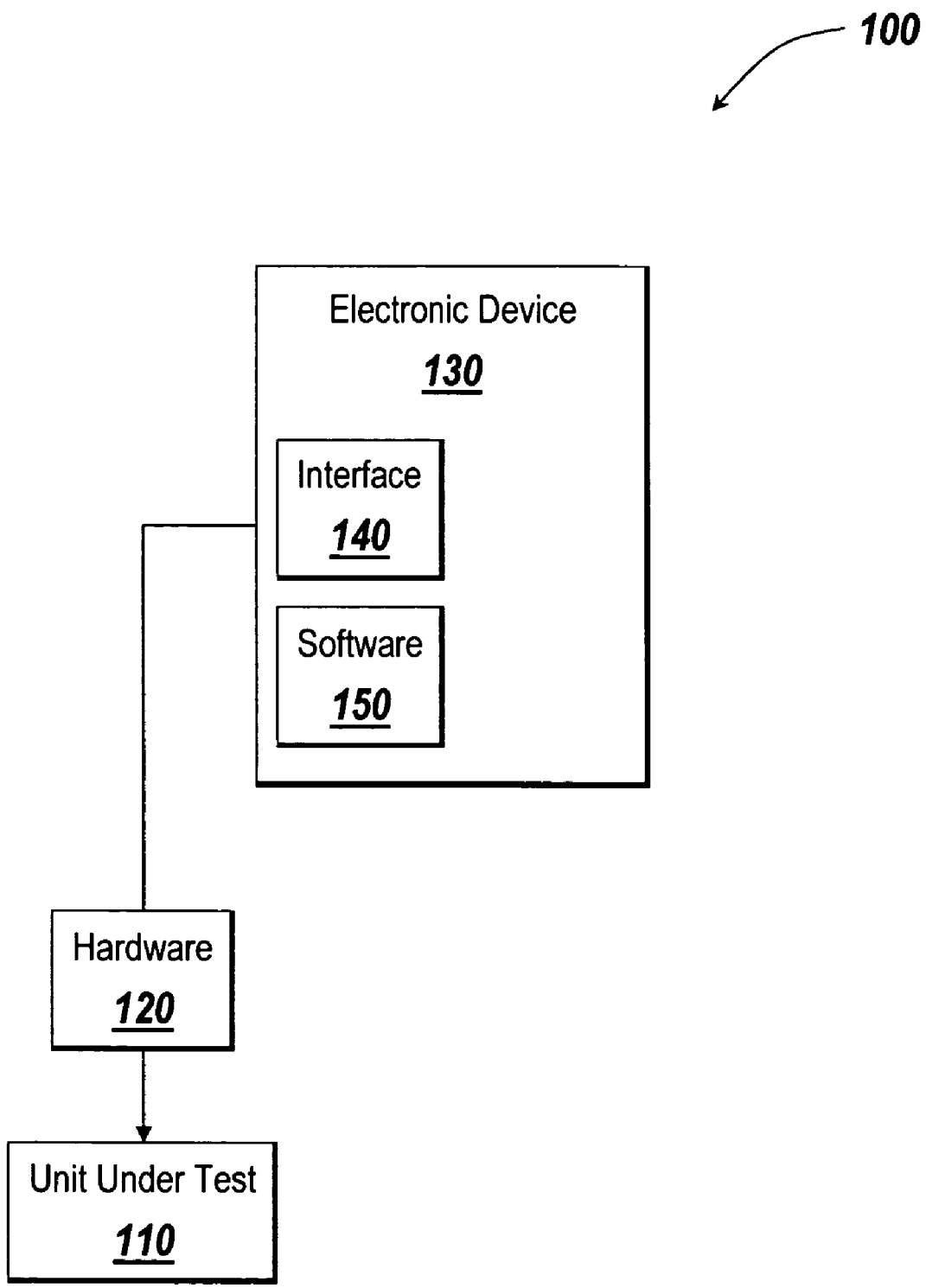
FIG. 1 is an exemplary measurement system that may be implemented in the illustrative embodiment of the present invention.

Measurement systems are often created for use in the Test & Measurement and Industrial Automation fields to enable test and/or control one or more devices. The measurement system, illustrated by way of example in FIG. 1, may include a unit under test 110, hardware 120, such as an instrument, to measure the unit under test 110, an electronic device 130, such as a computer, with an interface 140 to the hardware 120 and software 150 to send to and receive data from the hardware. It is understood that the unit under test may be a process being controlled. In an alternative embodiment, the hardware 120 may be incorporated in the unit under test 110.

Figure 2:
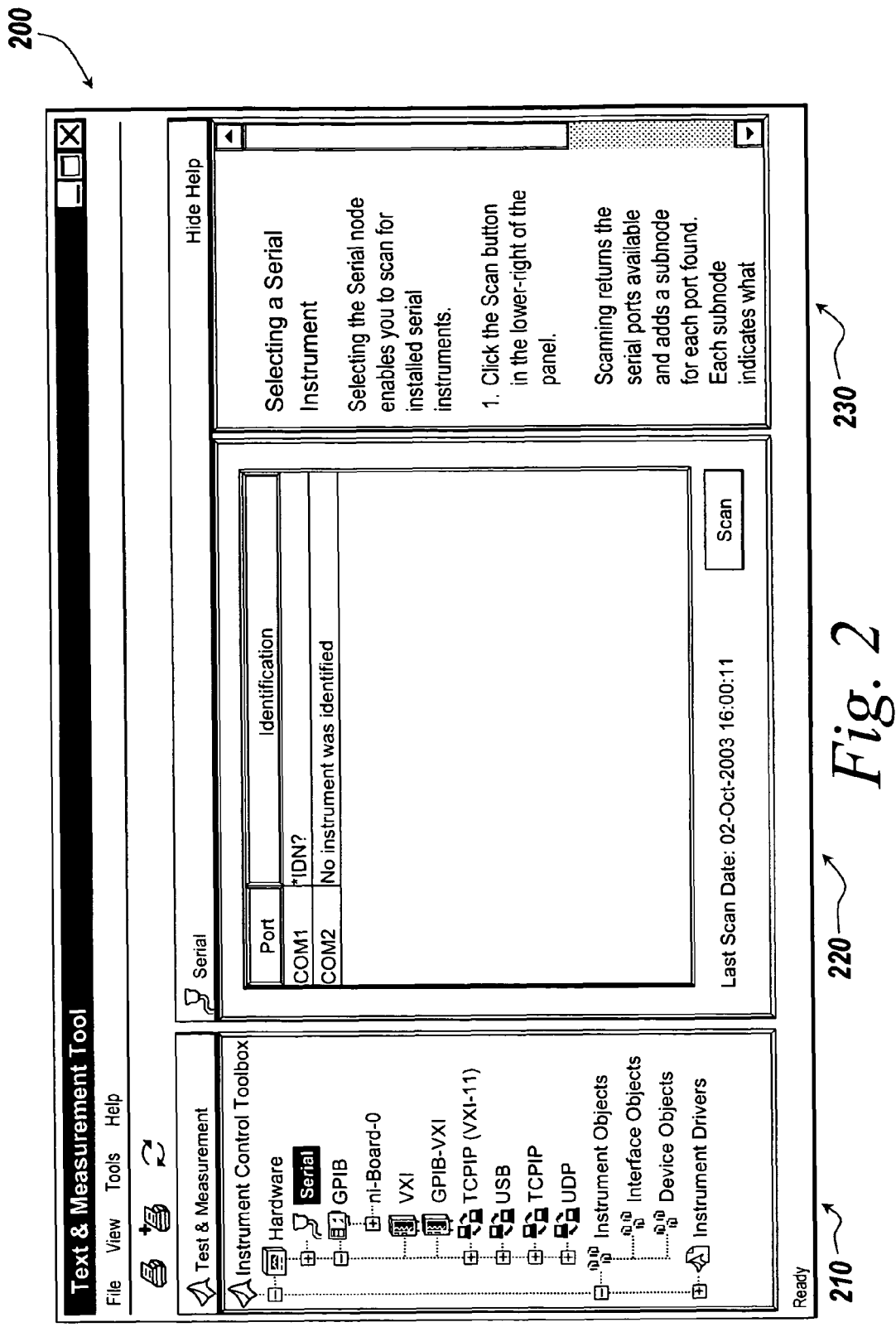
FIG. 2 an exemplary graphical interface according to the illustrative embodiment of the present invention.
Figure 3:
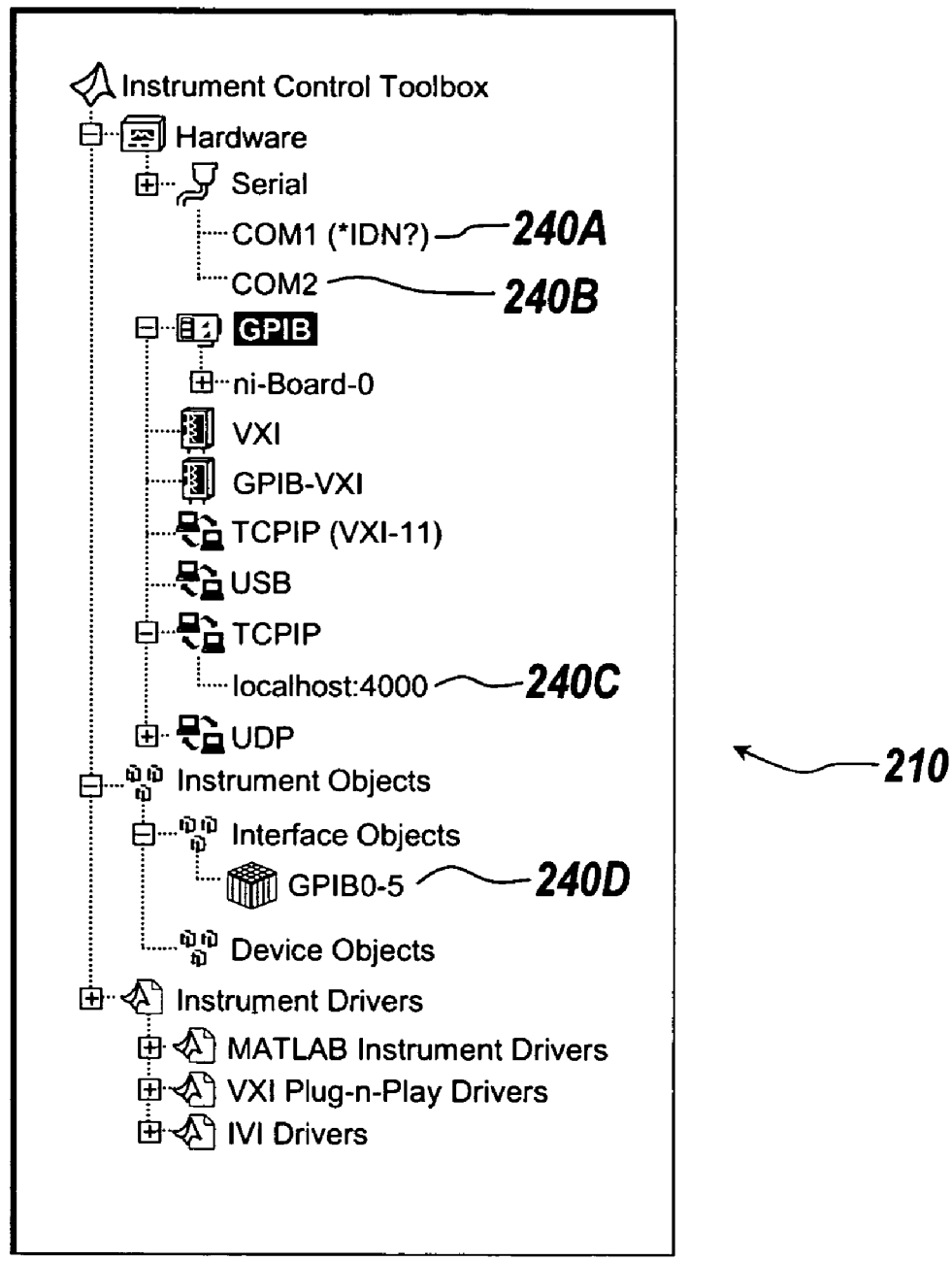
FIG. 3 is another example of a tree view that is illustrated by way of example for use in a graphical interface according to an embodiment of the invention.

According to an illustrative embodiment of the invention, a graphical interface 200 is provided to access various types of hardware and software by the use of hardware and/or software objects. FIG. 2 illustrates an example of a graphical interface 200 according to the illustrative embodiment of the invention. The graphical interface 200 may include a tree view 210, a detail view 220 and a help panel 230. It is understood that a wide variety of graphical configurations are within the scope of the invention, and the various views and/or panels may be added, deleted or modified. The various views may also be configured in multiple windows. The tree view may be configured as an expandable tree, grouping similar types of components. A further example of a tree view 210 is provided in FIG. 3.

The graphical interface 200 of the illustrative embodiment can provide access to hardware accessible to the electronic device and software accessible by the electronic device. The graphical interface 200 provides access to such hardware by the use of hardware objects depicted in the interface 200. In the same interface, software objects may also be depicted and provide access to software accessible by the electronic device. The graphical interface 200 allows multiple configurations for the same piece of hardware, such as by the use of multiple hardware objects corresponding to a specific unit of hardware. The interface 200 can display all configurations that have been defined and provides an opportunity to select what configuration is used to communicate with a piece of hardware by the selection of the desired hardware object and/or the opportunity to edit the properties of the hardware object.

The graphical interface 200 can provide access to any type of hardware device capable of receiving a signal from an electronic device and/or providing a signal to an electronic device. Examples of hardware devices can include, but are not limited to, any type of input/output device, industrial control and/or monitoring hardware, data acquisition cards, data transmission cards, instruments and image acquisition and transmission hardware. The hardware object may interface with a driver for communication with the hardware device. The interface to the hardware can be independent of the vendor of the hardware. For example, the interface supports GPIB cards by Agilent Technologies, Keithley, Measurement Computing Corporation, and others. When communicating with GPIB instruments, the graphical interface 200 may allow users to define the type of driver that the software object uses for communicating with the hardware. By way of example, the hardware object may support either the VISA driver or the vendor-supplied driver that comes with the GPIB board.

The graphical interface 200 also can provide access to software devices. A software device is a unit of code capable of receiving an input and/or sending an output. Examples of inputs and outputs can include, but are not limited to, signals, data or other types of information. Examples of receiving and sending can consist of writing information to a memory location or passing information to a communications port, such as a serial port, or a buffer. Examples of software devices include, but are not limited to, DLLs, objects, subroutines, and databases.

Figure 4:
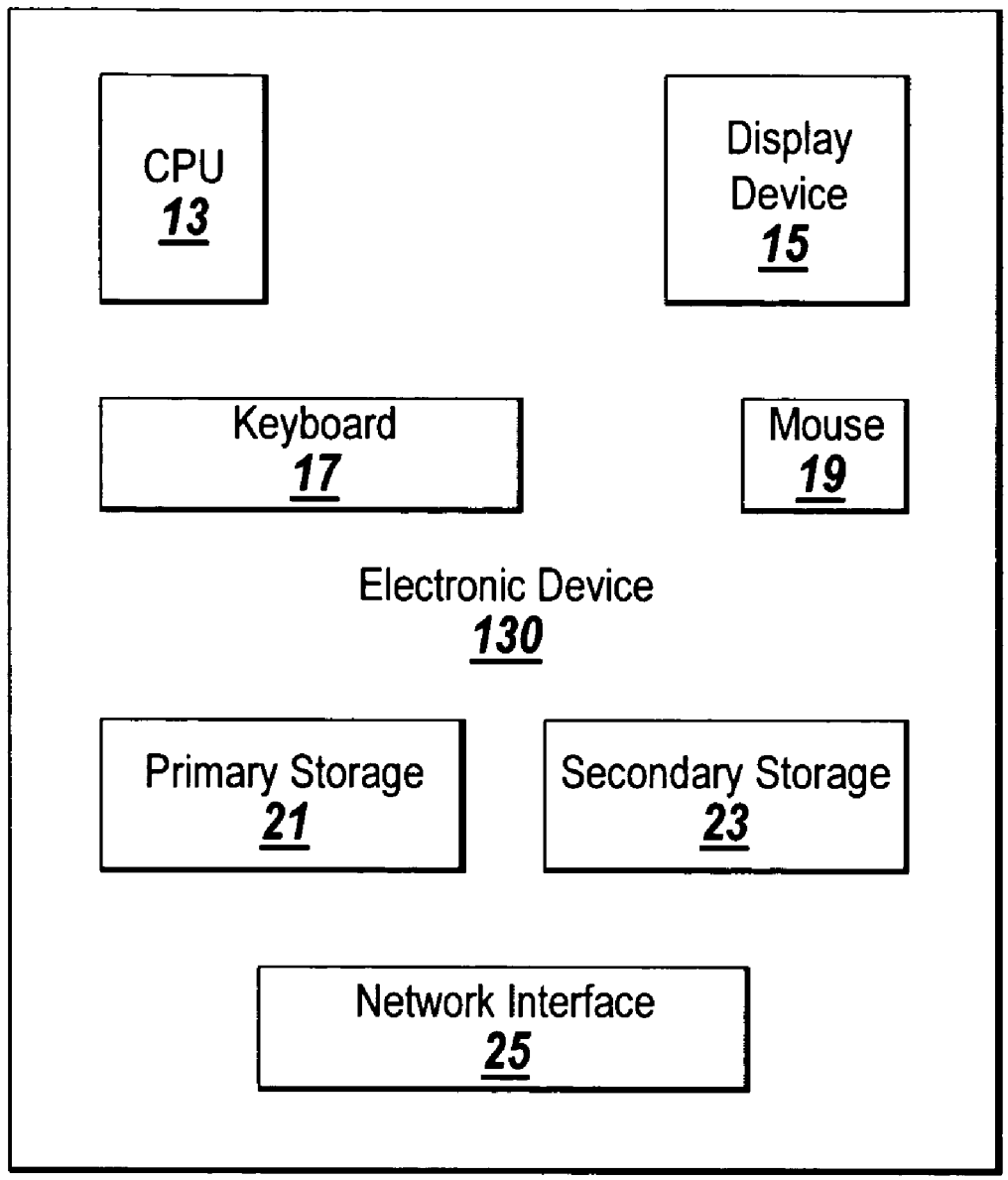
FIG. 4 is an electronic device suitable for practicing the illustrative embodiment of the present invention.

FIG. 4 illustrates one example embodiment of an electronic device 130 suitable for practicing the illustrative embodiment of the present invention. The electronic device 130 is representative of a number of different technologies, such as mainframes, personal computers (PCs), laptop computers, workstations, personal digital assistants (PDAs), Internet appliances, cellular telephones, and the like. In the illustrated embodiment, the electronic device 130 includes a central processing unit (CPU) 13 and a display device 15. The display device 15 enables the electronic device 130 to communicate directly with a user through a visual display. The graphical interface 200 may be displayed on the display device 15.

The electronic device 130 may further include a keyboard 17 and a mouse 19. Other potential input devices not depicted include a stylus, trackball, joystick, touch pad, touch screen, and the like. The electronic device 130 may include primary storage 21 and/or secondary storage 23 for storing data and instructions. The storage devices 21 and 23 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 21 and 23. JAVA is available from Sun Microsystems, Inc. of Santa Clara, Calif. The electronic device 130 may also include a network interface 25 for communicating with one or more electronic devices external to the electronic device 130. A modem (not shown) is one form of establishing a connection with an external electronic device or network. The CPU 13 may have coupled thereto one or more of the aforementioned components, either internally or externally.

The graphical interface 200 can be configured to operate on multiple platforms. Although the invention is not so limited, examples of platforms include MICROSOFT WINDOWS, available from Microsoft Corporation of Redmond, Wash. and Unix.

The graphical interface 200 may allow the definition of analysis objects that couple with hardware and software objects. The analysis objects can be used for a wide variety of programmatic applications, such as analysis of results from hardware and/or software. Examples of applications of analysis objects include, but are not limited to: interfacing with hardware and/or software objects and/or databases, interfacing with financial data sources such as Bloomberg, IDC and HyperFeed, analyzing financial market data, performing general and large-scale optimization, simulation, visualization and analysis of neural networks, reading, writing, filtering and/or plotting data, including data from examples such as a file, an environment, another object or a workspace variable. By way of further example, the analysis objects can be used to enable the graphical interface 200 to be modified to support any of the capabilities of MATLAB and its toolboxes.

Figure 5:
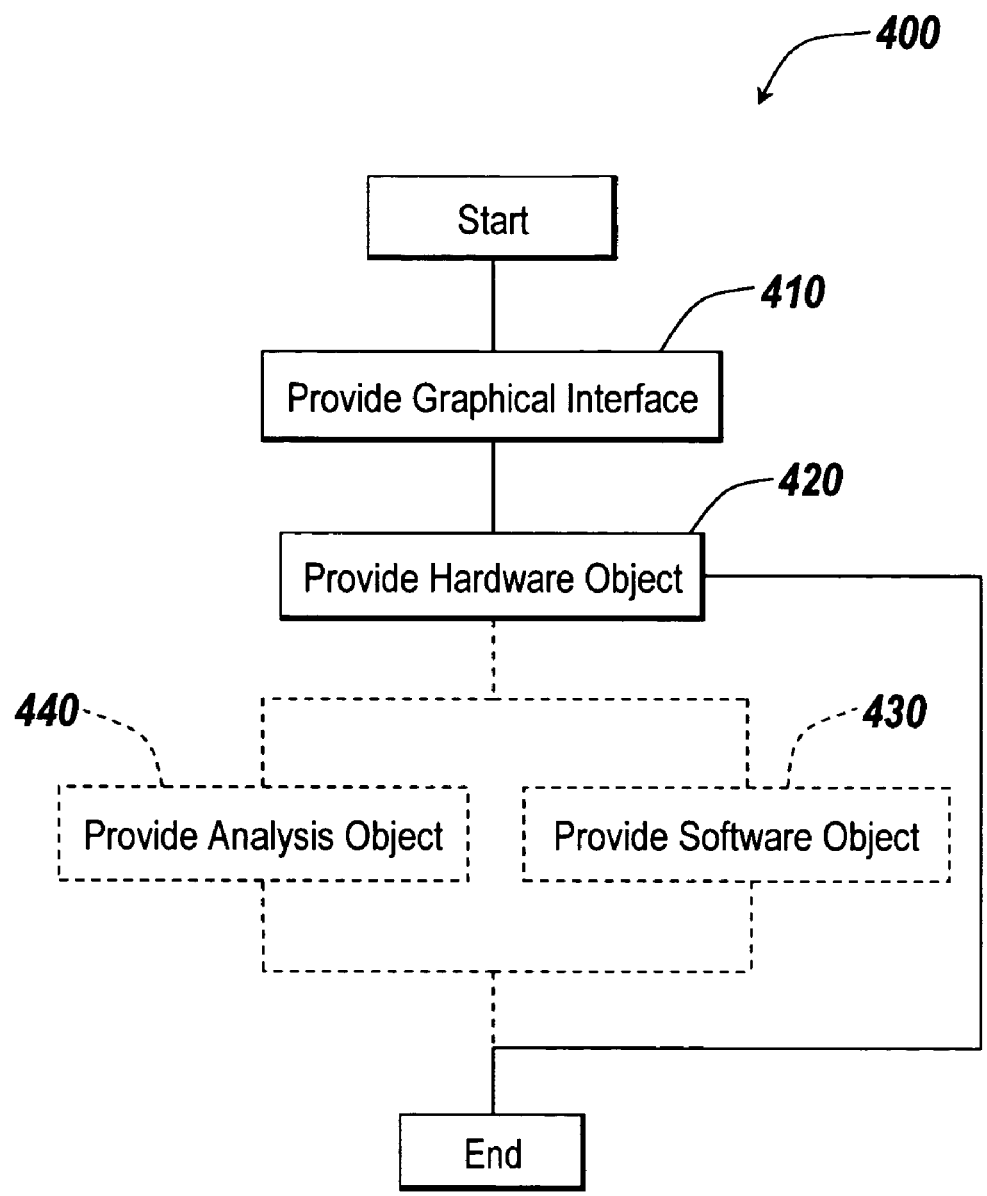
FIGS. 5-7 are methods according to an illustrative embodiment of the invention.

According to one embodiment of the invention as illustrated in FIG. 5, a method 400 is provided having the steps of providing a graphical interface 200, step 410. At least one hardware object is also provided, step 420. The hardware object is representative of a hardware device, is depicted in the graphical interface, and is configured to be interactive with the hardware device and enable communication between the graphical interface and the hardware device. Optionally, at least one software object may also be provided, step 430. The software object is representative of a software device and is depicted in the graphical interface. The software object is configured to be interactive with the software device and to enable communication between the graphical interface and the software device. Also, an analysis object may optionally be provided, step 440, and adapted to communicate with the hardware object and/or the software object for analysis of data from the hardware object and/or the software object.

Any number of modular components 240 can appear in the graphical interface 200. There may be a component that represents and interacts with instruments and another component that represents and interacts with data acquisition hardware. In the illustrative embodiment, each modular component is defined as a client of the graphical interface 200. A component generally performs tasks similar to those grouped with it, although a group may be formed of a single component, as illustrated by both the localhost:4000 component 240C and GPIB0-5 component 240D of FIG. 3.

According to the illustrative embodiment, in order for a client to appear in the graphical interface 200, the client implements a specific API. This API defines routines that each client defines. These routines may include, for example, defining what tree nodes appear in the graphical interface 200, defining what graphical panels are shown when a tree node is selected, defining the actions that occur when the graphical interface 200 scans for available hardware and defining what information is saved between sessions of the graphical interface 200.

The graphical interface 200 may be implemented with an extensible API. This allows other developers or users to define custom objects to appear in the graphical interface 200. Also, according to the illustrative embodiment, a client can optionally extend a base client. The base client defines default implementations for the methods in the API. This can assist client writers since the client writer then need only have to write those methods that they are interested in. For example, if the client does not interact with hardware, the client does not need to implement the method that scans for available hardware. Instead, the client can use the base client scan for hardware implementation which may be configured to do nothing.

In the illustrative embodiment of the invention, the API can specify how to define a root node. In this embodiment of the invention, each browser client should include all it's tree nodes underneath a root node. To define the root node, the browser client implements the getRootNode method. This method takes no input arguments and returns a Browser-TreeNode. For example:

```
public BrowserTreeNode getRootNode( ){
return new BrowserTreeNode("Instrument Control", this);
}
```

A browser client's root node may have a list of sub-folders that the remaining nodes are grouped into. These nodes can be defined with the getLevelOneNodes method. This method takes no input arguments and returns a BrowserTreeNode[ ] of nodes. For example:

```
private BrowserTreeNode level1=new BrowserTreeNode("Instrument Hardware", this);
private BrowserTreeNode level2=new BrowserTreeNode("Instrument Control Objects", this);
private BrowserTreeNode[ ] levelNodes={level1, level2};
public BrowserTreeNode[ ] getLevelOneNodes( ){
return levelNodes;
} © 2003 The MathWorks, Inc.
```

To avoid removal of the node when it's children nodes are removed, the node may be defined as a level-one node.

Further according to the illustrative embodiment, each browser client can add new top-level menus and menu items beneath existing menus. To define the menu items, a client implements three methods: getHelpMenuItem, which returns the Toolbox Help JMenuItem; getAboutMenuItem, which returns the About Toolbox JMenuItem; and getMenus, which returns an array of JMenus to be added to the menubar.

The getHelpMenuItem method returns a JMenuItem for displaying the Toolbox Help. For example:

```
private JMenuItem helpMenuItem=new JMenuItem("Instrument Control Toolbox");
public JMenuItem getHelpMenuItem( ){
return helpMenuItem;
} © 2003 The MathWorks, Inc.
```

The getAboutMenuItem returns a JMenuItem for displaying the About Toolbox dialog. For example:

```
private JMenuItem aboutMenuItem=new JMenuItem("About Instrument Control");
public JMenuItem getAboutMenuItem( ){
return aboutMenuItem;
} © 2003 The MathWorks, Inc.
```

Additional menu items can be added with the getMenus method. For example:

```
private JMenu[ ] menus=null;
public JMenu[ ] getMenus( ){
if (menus==null) {
//Create the View menu items.
JMenu view=new JMenu("View");
JMenuItem icView=new JMenu("Instrument Control Toolbox");
view.add(icView);
JCheckBoxMenuItem hardware=new JCheckBoxMenuItem("Hardware", true);
JCheckBoxMenuItem instrObj=new JCheckBoxMenuItem("Instrument Objects", true);
JCheckBoxMenuItem instrDriver=new JCheckBoxMenuItem("Instrument Drivers", true);
icView.add(hardware);
icView.add(instrObj);
icView.add(instrDriver);
//Create the Tools menu items.
JMenu tools=new JMenu("Tools");
JMenu icTools=new JMenu("Instrument Control Toolbox");
tools.add(icTools);
JMenuItem newObject=new JMenuItem("New Instrument Control Object . . . ");
JMenuItem scan=new JMenuItem("Scan for Instrument Hardware");
icTools.add(newObject);
icTools.add(scan);
//Create output.
menus=new JMenu[2];
menus[0]=view;
menus[1]=tools;
}
return menus;
} © 2003 The MathWorks, Inc.
```

The detail view 220 may be updated based on the node selected in the tree view 210 when the user left clicks on a node in a tree. To define what JPanel is added to the Detail View, the browser client implements the getPanel method. This method takes three input arguments: the node that was selected; the node that was previously selected; and an array of nodes that are selected. Based on the previous node selected and the node that is currently selected, the client may decide that the detail view 220 does not need to be updated. Each node has an okToUpdatePanel property. If okToUpdatePanel is configured to false, then the detail view 220 will not be repainted. If okToUpdatePanel is configured to true, the panel in the detail view 220 will be removed and the new panel will be added. The okToUpdatePanel Boolean is configured with the updatePanel method. The getPanel method returns a JPanel that will be added to the detail view 220 (if okToUpdatePanel is true). If the getPanel method returns null, the detail view 220 will be cleared. The third input argument may be a list of nodes that are selected. If the client allows multiple selection, the client should return the correct panel based on all the nodes selected. If the client does not allow multiple selection and more than one node is selected, the client should return null. In the illustrative embodiment, it can be assumed that the first argument passed to the getPanel method is the node that is currently selected.

There are three methods in the illustrative embodiment for adding a node to the tree view. To add a node, the browser client may implement the postNodeAddedEvent method. The input arguments taken by postNodeAddedEvent method are dependent upon the method used to add the node. The post-NodeAddedEvent method may post the event to all its listeners.

According to the first illustrative method for adding a node to the tree view, a node is added based on the node's path. This method takes the following input arguments: the node name, e.g. GPM-NI-01; the path to the node that is being added, e.g. Instrument Control-Instrument Control Objects; the node that is being added (BrowserTreeNode); the mode for adding a node; and a Boolean variable indicating if the node should be selected after it is added.

There are four modes for adding a node. In the first mode, if the path exists and the node does not exist, the node is added. If the path exists and the node exists, the node is added. There will be two nodes with the same name. If the path does not exist, the node is not added. In the second mode, if the path exists and the node does not exist, add the node. If the path exists and the node does exist, do not add the node. If the path does not exist, the elements in the path that do not exist are added and the node is added.

According to the third mode, if the path exists and the node does not exist, the node is added. If the path exists and the node does exist, the node name is incremented and the node is added. If the path does not exist, the elements in the path are added that do not exist and the node is added. In the fourth mode, the node is always added as is. According to the illustrative embodiment, in all of the modes, the node is always added to the end of the parent list.

The second illustrative method for adding a node to the tree view is similar to the first method, except that the position the node is inserted is a sixth input argument. For example, if the parent node contains three nodes, and the position for insertion of the node is greater than 3, the node is appended to the parent's child list.

The third illustrative method for adding a node to the tree view is slightly different than the first two methods in that the client defines the parent node that the child node is inserted to. This method takes the following input arguments: the parent node (BrowserTreeNode); the child node, i.e. the node that is being inserted (BrowserTreeNode); a Boolean variable indicating if the node should be selected after it is added; and the position that the node should be inserted.

According to the illustrative embodiment, there are four methods that will remove a node from a tree view. To remove a node, the browser client may implement the postNodeRemovedEvent method. The input arguments taken by postNodeRemovedEvent method are dependent upon the method used to remove the node. The postNodeRemovedEvent method may post the event to all its listeners. For an example, refer to BaseBrowserClient. In all methods of the illustrative embodiment, after the node(s) are removed, the parent node of the last node removed is selected.

According to the first method, the node is removed based on the node's name. The following input arguments are used: the node name; the path to the node that is being deleted; and the mode for deleting a node.

In the illustrative embodiment, there are four modes for deleting a node. In the first mode, if the specified path and node exist, the node is removed. In the second mode, if the specified path and node exist, the node is removed. If the parent node of the node removed contains no other nodes, the parent node is removed. This continues until there are no more parent nodes or a non-empty parent node is encountered. According to the third mode, if the specified path and node exist, the node is removed. If the parent node of the node removed contains no other nodes, it is removed. The fourth mode provides that if the specified path and node exist, the node is removed. If the parent node of the node removed is empty and is not a root or level-one node, such as may be defined by the getRootNode and getLevelOneNodes methods, the node is removed. This continues until a parent node is encountered that is non-empty or is a root node or is a level-one node.

According to the second mode for deleting a node, the node is removed based on the node's UserData. In summary, the node that matches the given UserData is removed. The following input arguments are used: the path to the node that is being deleted; the UserData of the node that is to be deleted; and the mode for deleting a node. This method should be used if the name of the node may be modified, such as incremented, when it is added. Or, it is possible to have two or more nodes with the same name.

The third mode for deleting a node defines the node that is to be removed based on the node itself and it's parent. The following input arguments are used: the parent node and the child node that is being deleted.

The fourth mode defines the node that is to be removed based on the node itself. The input argument of the node that is being deleted is used.

If the client changes the node's name, it may post an event to the tree view 210 to refresh itself. To refresh a node, the browser client may implement the postNodeUpdatedEvent method according to the illustrative embodiment. The node that has been updated is passed as an input argument to the postNodeUpdatedEvent method. The postNodeUpdatedEvent method may post the event to all its listeners.

When a node is selected in the tree view 210, the client may add additional menu items to the existing menus. To do this, the browser client may implement the getMenus method. The getMenus method takes the following input arguments: the BrowserTreeNode that is currently selected; the BrowserTreeNode that was previously selected; and an array of all the selected nodes. Based on the input arguments, the browser client may decide to return menu items. If no menus are to be added, the getMenus method should return null and the node's updateMenu method should be called with true, which may be the default value. If the menu items from the previously selected node apply to the node that is currently selected, the node's updateMenu method should be called with false and the getMenu method should return null. Otherwise, the getMenus method should return a JMenu[ ] of menus to add. For example:

```
public JMenu[ ] getMenus(BrowserTreeNode node, BrowserTreeNode oldNode) {
  if (node.getClient( )!=oldNode.getClient( )){
  //The previously selected node was this client's node.
  //Define the menu items to add.
  JMenu fileMenu=new JMenu("File");
  JMenuItem export=new JMenuItem("Export");
```

```
    JMenuItem test=new JMenuItem("Test");
    fileMenu.add(export);
    fileMenu.add(test);
    fileMenu.addSeparator( )
    //Construct the output.
    nodeMenus=new JMenu[1];
    nodeMenus[0]=fileMenu;
    //Indicate that the menu items need to be updated.
    node.updateMenu(true);
    return nodeMenus;
  } else {
    //The previously selected node was this client's node therefore the
    //menus do not need to be updated.
    node.updateMenu(false);
  }
  return null;
} © 2003 The MathWorks, Inc.
```

The menu items are added to the top of the JMenu specified. Therefore, the client may add a separator after the menu items that is being added. It may not be permissible to add a JMenu that does not already exist. For example, if the menubar contains only File and Help menus, the client may be prevented from adding a Demo menu to the menubar.

The graphical interface 200 can save information between sessions of using the graphical interface 200. For example, the hardware, software and analysis objects created may be saved for use in future sessions, thereby noting hardware devices and the drivers found. This allows users to pick up where they left off when using the graphical interface 200 without having to re-scan for information. The graphical interface 200 may also save information about actions the user took, such as software objects that were created between sessions of using the graphical interface 200.

For example, before the browser is closed, the client may want to save the hardware that is found so that the next time the browser is opened, the tree can be populated with the information from the previous session. In order to do this, the client may implement the save and load methods. A cleanup client method may be called after the save method. The save method takes the following arguments: BrowserConfigFileWriter and an XML element. The file that contains the data is an XML file. The BrowserConfigFileWriter creates the XML file and contains some helper methods for adding nodes to the XML file. The second argument, the XML element, is the element that is specific to the client currently being saved. All nodes that are added to the XML file should be added to this element. The following example saves some information from a hardware device found on a serial port.

```
public void save(BrowserConfigFile file, Element parent){
    for (int i=0;i<data.length;i++){
    Element instr=file.addNode(parent, "Instrument");
    instr.setAttribute("Type", "serial");
    instr.setAttribute("Identification", (String)data[i][1]);
    instr.setAttribute("Port", (String)data[i][0]);
    }
} © 2003 The MathWorks, Inc.
```

The load method takes the following arguments: BrowserConfigFileReader and an XML node. The XML node contains the information that the client saved.

```
public void load(BrowserConfigFileReader bf, Node node) {
    if (node==null) {
    return;
    }
    NodeList children=node.getChildNodes( )
    for (int i=0;i<children.getLength( )i++){
    String name=children.item(i).getNodeName( )
    if (name.equals("Instrument")) {
        String   type=((Element)children.item(i)).getAttribute("Type");
        String id=((Element)children.item(i)).getAttribute("Identification");
        String   port=((Element)children.item(i)).getAttribute("Port");
    }
    }
} © 2003 The MathWorks, Inc.
```

In this example, the BrowserConfigFileReader does not contain any helper methods for reading the XML file. It is understood that if helper methods are desired, they may be added.

To get the frame to the hardware browser, the browser client may open additional dialogs from menu items, right-click menus, a double-click or from the detail view panel. If the dialog is modal, the dialog may be handed a frame that the dialog is attached to. To get the Browser frame, the browser client may implement the setBrowserFrame method. The Browser Client could store the frame in a local variable to be used as needed.

A browser client can be defined according to the illustrative embodiment of the invention as follows. First, an XML file is created. In the present example, the file is named tmgui.xml. The tmgui.xml file may contain information about other graphical user interfaces that may be used with the present invention. The tmgui.xml file may be placed in a toolbox root directory, e.g. matlabroot/toolbox/instrument/instrument. The tmgui.xml file may include the following:

```
<tmguiinfo>
<gui>
<name>Browser</name>
<client>com.mathworks.toolbox.instrument.browser.InstrumentControlBrowser</client>
</gui>
</tmguiinfo>
© 2003 The MathWorks, Inc.
```

Figure 6:
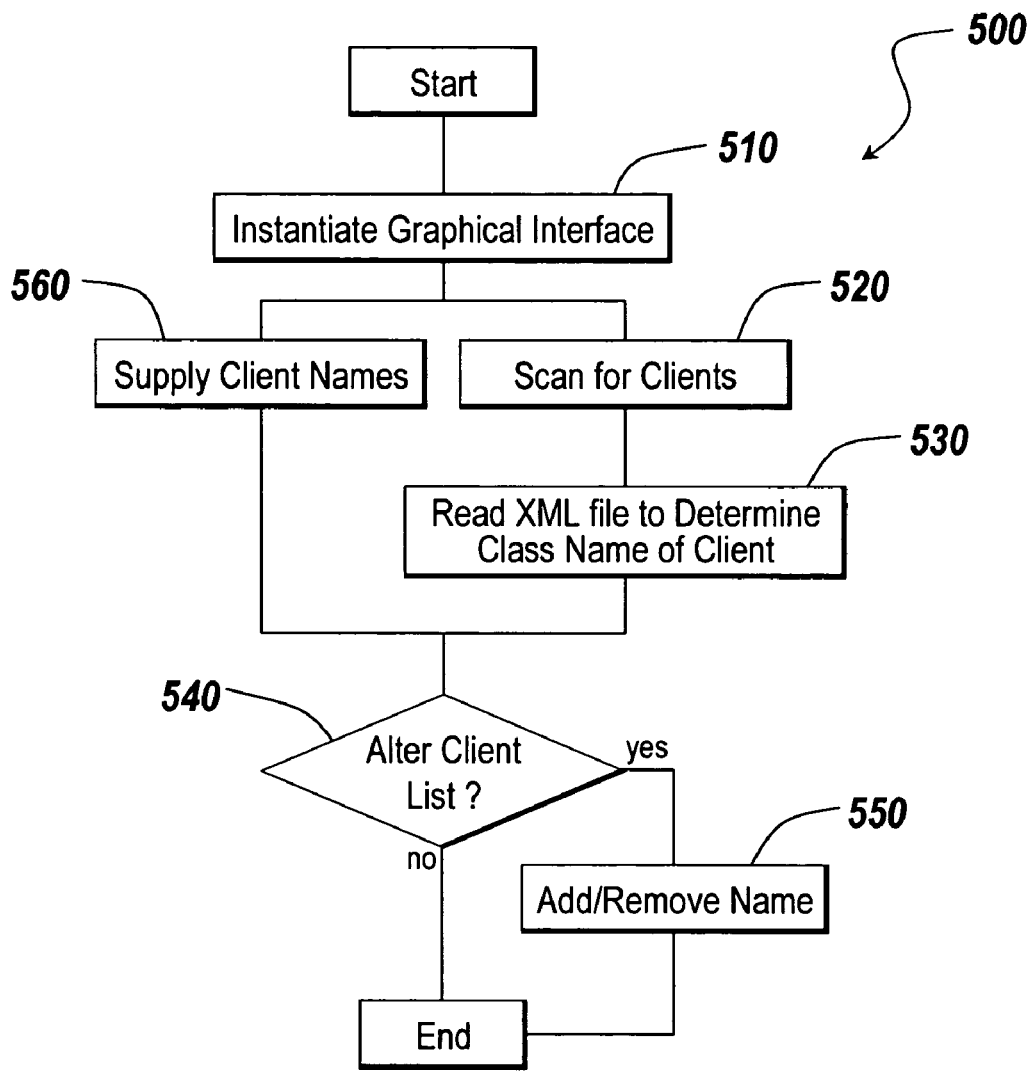

As illustrated in FIG. 6, when the graphical interface 200 is instantiated, step 510, the graphical interface 200 may scan for clients, step 520. In the illustrative embodiment, the graphical interface 200 is used with MATLAB, although the invention is not so limited. In this embodiment, the MATLAB path is scanned for clients. When scanning for clients, the graphical interface 200 looks for all tmgui.xml files on the MATLAB path. According to the illustrative method 500, the XML file is read, step 530, to determine the class name of the client. If the client list is to be altered, step 540, this approach allows clients to be added or removed, step 550, from the graphical interface 200 based on the user's choice. For example, a tmgui.xml file could be removed or renamed if the component it represents should not be shown in the graphical interface 200. Or the client names can be supplied, step 560, to the graphical interface 200 and only those clients would be instantiated.

In the illustrative embodiment, the clients that are found are instantiated and stored within the graphical interface 200. The tree nodes that have been defined by each client are added to the tree view 210 of the graphical interface 200. Each tree node is defined by a java class that extends the java DefaultMutableTreeNode class. This allows for some additional information to be stored with the tree node. This information includes the client that created the tree node, the panel that is shown in the detail view when the tree node is selected, a flag indicating if the tree node is editable, etc. This assists clients in managing what occurs when a tree node is selected.

Figure 7:
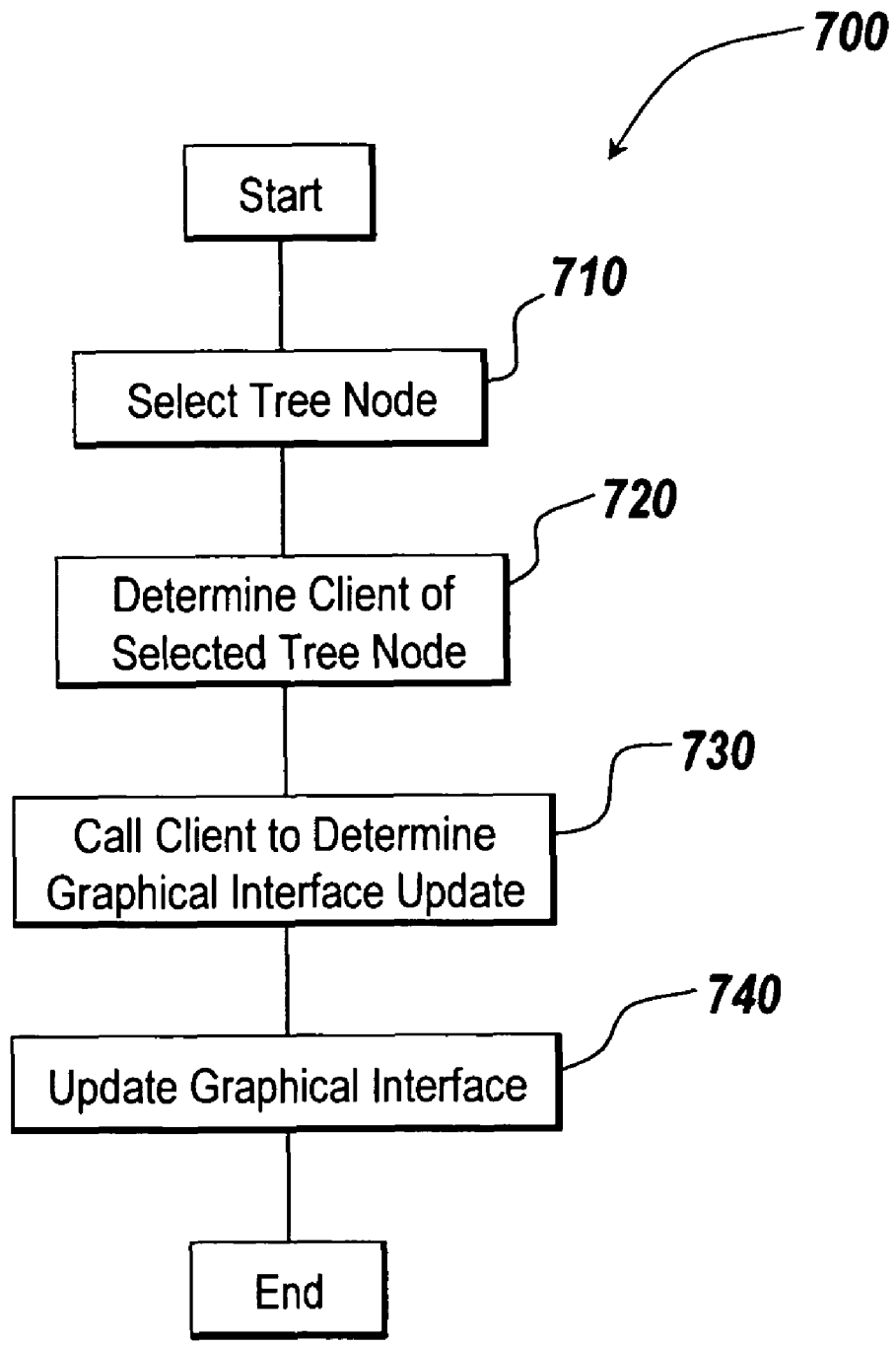

As shown by way of example in the method 600 of FIG. 7, when a tree node is selected, step 710, the graphical interface 200 determines, step 720, what client added the selected tree node to the graphical interface 200. The graphical interface 200 then calls the client, step 730, to determine how the graphical interface 200 should be updated, step 740. For example, the client returns instructions on what menu items should be added, what panel should be shown in the detail view 220 and what help text should be shown in the help panel 230.

As noted above, the graphical interface 200 also contains instances of the tree view 210, detail view 220 and help panel 230. Based on the instructions returned by the client, the graphical interface 200 instructs the tree view 210, detail view 220 and help panel 230 on how to update. The graphical interface 200 also controls the menu bar, frame, toolbar and status bar. The menu bar is also updated based on the client's instructions.

Since the client defines the menus and panels that are shown in the graphical interface 200 of the illustrative embodiment, when a user interacts with one of them, the client can define what occurs, for example, the client can define what happens when a button is selected and the graphical interface 200 is not involved. However, the client can post events to the graphical interface 200 if it should be updated based on the user actions. For example, the client can post an event to have a tree node added to the graphical interface 200 or to have the status bar updated with status information.

According to the illustrative embodiment, the user may optionally define what hardware is available in the graphical interface 200. Once a hardware device has been added, the hardware device can be identified using the same scan routine as other hardware devices. The hardware device that was added may also be saved between graphical interface 200 sessions.

Software objects, hardware objects and analysis objects may be on a local or remote machine. If on a remote machine, the objects may optionally be accessed through a web page that, in the illustrative embodiment, shows the same graphical interface 200.

Figure 8:
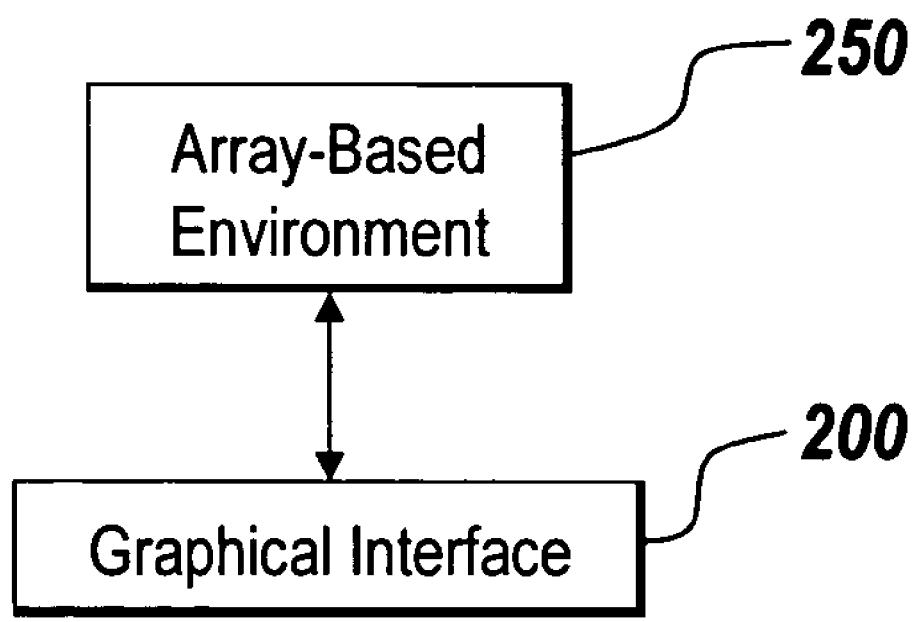
FIG. 8 is a schematic illustration of an array-based environment and graphical interface according to an illustrative embodiment of the invention.

With reference to FIG. 8, according to the illustrative embodiment, the graphical interface 200 provides live interaction with an array-based environment 250. Examples of array-based environments can include MATLAB or other interpretive programming environments capable of interfacing with one or more arrays. Changes that are made to the software objects, hardware objects and analysis objects in the array-based environment 250 are reflected in the graphical interface 200. For example, if the hardware object is disconnected from an associated hardware device from within the array-based environment 250, the graphical interface 200 is updated to indicate that the hardware object is no longer connected to the hardware device. Similarly, if a software object is created in the array-based environment 250, the graphical interface 200 may be updated to include the software object. The user may interact with the software object, hardware object and analysis object from either the array-based environment 250 or the graphical interface 200.

Results obtained with the graphical interface 200 may be exported from the graphical interface 200 to the array-based environment. This allows further analysis to be done on the data in the array-based environment 250.

The graphical interface 200 of the illustrative embodiment provides an option to scan for available hardware. Available hardware can include any hardware that the electronic device is able to communicate with. Communication can be in many forms, including digital and/or analog signals and signals in wired, wireless, electrical and/or optical form, or other forms or methods apparent to one of skill in the art. In scanning for available hardware, the illustrative embodiment first attempts to identify hardware. For example, when identifying instruments, various commands are sent to the instrument to try to identify it. Different hardware devices respond to different commands. The commands that are used to identify the hardware devices may be user-definable. This can enable any hardware device, such as any instrument, able to communicate with the electronic device to be identified and represented in the graphical interface 200.

The graphical interface 200 can provide embedded procedural help in the help panel 230 to assist users with the graphical interface 200. The help can be hidden from the graphical interface 200 giving the user more space for interacting with the graphical interface 200. According to the illustrative embodiment, clients of the graphical interface 200 can control what help is included based on the root node or tree node that is selected.

The graphical interface 200 and the clients may be implemented using JAVA. Using the JAVA-to-MATLAB interface, the graphical interface 200 and its clients can pass information from the JAVA side to the MATLAB side. Similarly, when something occurs on the MATLAB side, an event can be posted that the client is listening for. This allows the graphical interface 200 to be updated based on user actions on the MATLAB side.

The software 150 operating on the electronic device 130 may include software tools, such as MATLAB®, Simulink®, MATLAB® Toolboxes, and Simulink® Blocksets, all from The MathWorks, Inc. of Natick, Mass. One of skill in the art will appreciate that the described software tools are merely illustrative and the invention is applicable to use with other software tools. Another example of software tools that may be used with embodiments of the invention include those related to OLE for Process Control (OPC).

Built-in interfaces of MATLAB® enable users to access and import data from instruments, files, and external databases and programs. In addition, MATLAB® enables the users to integrate external routines written in C, C++, Fortran, and Java with the MATLAB® applications. In the illustrative embodiment, the software objects and/or hardware objects that are created with the graphical interface 200 can be converted to MATLAB® code, or other types of code, such as C, C++, Fortran, and Java, or saved to a binary file. The software objects and/or hardware objects can be re-created from either the MATLAB® code or from loading the binary file.

According to the illustrative embodiment, an ability to record user actions with the graphical interface 200 and optionally convert the user actions to MATLAB® code in order to later recreate or automate the user actions. Examples of these user actions can include, but are not limited to: connecting/disconnecting to/from hardware by selecting a button, sending data to and receiving data from the hardware by selecting buttons and entering text strings. These interactions with the graphical interface are converted to code that creates a software object, hardware object or analysis object, configures the object and writes and reads data from the object. The code is created by incorporating the relevant characteristics of the graphical interface at the time of the user action in order to properly specify the code. This code can be executed from within the MATLAB® environment. The code can also be modified to include analysis routines. The code that is generated can also be used to develop a deployable solution.

Simulink® provides a graphical user interface (GUI) component that allows drafting of block diagram models by users.

The visual representation of the target systems in the block diagrams allows for a convenient interpretation of the target systems and provides an intuitive notion of the behavior of the target systems. Simulink® also allows users to simulate the designed target systems to determine the behavior of the systems. The graphical interface 200 of the present invention may interact with Simulink® as described above in relation to MATLAB®. According to an illustrative embodiment, the graphical interface 200 can be used from within Simulink® and/or objects created by the graphical interface 200 can be exported and used by Simulink®.

MATLAB® Toolboxes include a plurality of Toolboxes, such as Instrument Control Toolbox, Data Acquisition Toolbox and Image Acquisition Toolbox. The Instrument Control Toolbox provides communications with instruments, such as oscilloscopes and function generators, directly from MATLAB. Instrument Control Toolbox supports for GPIB, VISA, TCP/IP, and UDP communication protocols. Users may generate data to send out to an instrument, or read data for analysis and visualization. The transferred data can be binary or ASCII. The Instrument Control Toolbox supports both synchronous and asynchronous read and write functions. A synchronous operation blocks access to the command line until the read or write is completed. An asynchronous operation does not block access to the command line, and additional MATLAB® commands can be issued while the read or write operation executes. According to the illustrative embodiment, the components 240 shown in the graphical interface 200 can change based on the MATLAB® Toolbox capabilities installed on the electronic device.

Simulink® Blocksets contain application specific blocks that support the modeling and simulation of systems in the block diagram environment provided by Simulink®. Simulink® Blocksets provide blocks that are incorporated into the models of the systems, and include subsets, such as DSP Blockset, Fixed-point Blockset and Communications Blockset, from The MathWorks, Inc. of Natick, Mass. The Blocksets provide utilities for the development and integration of models for the systems and sub-systems of the systems. According to the illustrative embodiment, the components 240 shown in the graphical interface 200 can change based on the Simulink® Blockset capabilities installed on the electronic device.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. A non-transitory computer readable storage medium storing computer executable instructions that when executed on a processor manage a graphical interface, the medium storing:
   instructions for providing a graphical interface, where the graphical interface:
      accesses a hardware device that is associated with a plurality of properties used to communicate with the hardware device, and
      accesses a software device being accessible through the graphical interface, the software device being accessible to a computer;
   instructions for scanning for available hardware devices, wherein
      two or more of the available hardware devices each respond to different commands, and
      a response to a given one of the commands identifies one of the available hardware devices, and the given one of the commands is user-defined;
   instructions for creating an additional hardware object for each hardware device detected and not already associated with a hardware object;
   instructions for providing a first interactive hardware object, where the first interactive hardware object:
      is accessible to the computer,
      is depicted in the graphical interface, and
      interacts with the hardware device;
   instructions for providing a first configuration represented by the first interactive hardware object, where the first configuration represents a collection of properties used to communicate with the hardware device and a first collection of values associated with the properties;
   instructions for providing a second interactive hardware object, where the second interactive hardware object:
      is accessible to the computer,
      is depicted in the graphical interface, and
      interacts with the hardware device;
   instructions for providing a second configuration represented by the second interactive hardware object, where the second configuration represents the same collection of properties as the first configuration and a second collection of values associated with the properties, wherein at least one value of a property differs between the first configuration and the second configuration;
   instructions for providing a software object, wherein the software object is representative of the software device, where the software object is depicted in the graphical interface and is configured to be interactive with the software device;
   instructions for displaying the first hardware object and the second hardware object simultaneously;
   instructions for receiving, from a user, a selection of at most one hardware object; and
   instructions for communicating with the hardware device corresponding to the selected hardware object using the configuration represented by the hardware object.

2. The computer readable storage medium of claim 1, further comprising providing an analysis object, wherein said analysis object is adapted to communicate with at least one of said hardware object and said software object for analysis of data from at least one of said hardware object and said software object.

3. The computer readable storage medium of claim 2, wherein the analysis object filters data.

4. The computer readable storage medium of claim 2, wherein the analysis object plots data.

5. The computer readable storage medium of claim 1, further comprising:
   instructions for receiving code for execution by the hardware object.

6. The computer readable storage medium of claim 1, wherein a plurality of hardware objects are provided for a single hardware device.

7. The computer readable storage medium of claim 1, wherein a plurality of hardware objects are provided for a plurality of hardware devices.

8. The computer readable storage medium of claim 1, wherein at least one of instructions for providing at least one hardware object and providing at least one software object further comprises instructions for accessing at least one of a hardware object and a software object located on a remote computer.

9. The computer readable storage medium of claim 8, wherein instructions for accessing is performed through a web page.

10. The computer readable storage medium of claim 8, wherein instructions for accessing is performed over a network.

11. The computer readable storage medium of claim 10, wherein instructions for accessing is performed by passing commands over the network in a MATLAB environment.

12. The computer readable storage medium of claim 1, further comprising:
instructions for modifying at least one of the hardware object and the software object.

13. The computer readable storage medium of claim 12, wherein modifying specifies a protocol for use by the hardware object for communication with the hardware device.

14. The computer readable storage medium of claim 12, wherein modifying modifies a value stored in an array of an array-based environment.

15. The computer readable storage medium of claim 1, further comprising:
instructions for modifying a value stored in an array of an array-based environment, thereby modifying at least one of the hardware object and the software object.

16. The computer readable storage medium of claim 1, further comprising:
instructions for exporting data from the graphical interface to an array-based environment.

17. The computer readable storage medium of claim 1, further comprising:
instructions for converting user actions with the graphical interface into code.

18. The computer readable storage medium of claim 17, wherein the code is created in a MATLAB environment.

19. The computer readable storage medium of claim 17, wherein the code comprises steps to create an analysis object, configure the analysis object and write and read data from the analysis object.

20. The computer readable storage medium of claim 17, wherein the code comprises an analysis routine.

21. The computer readable storage medium of claim 1, wherein the graphical interface is implemented with an extensible API.

22. The computer readable storage medium of claim 1, further comprising:
instructions for generating an analysis object so that the analysis object can be used in MATLAB.

23. The computer readable storage medium of claim 1, further comprising:
instructions for generating an analysis object that can be used in SIMULINK.

24. The computer readable storage medium of claim 1, wherein the graphical interface is adapted to operate on a plurality of operating systems.

25. The computer readable storage medium of claim 1, wherein the graphical interface comprises a tree view, wherein the tree view groups the hardware objects and the software objects by a functionality characteristic.

26. The computer readable storage medium of claim 1, wherein the hardware object enables communication between the graphical interface and the hardware device, and the software object enables communication between the graphical interface and the software device.

27. A method for managing an interface, the method comprising:
providing a graphical interface that provides interaction with an array-based environment, a hardware device and a software device being accessible through the graphical interface, the software device being accessible to a computer, the hardware device associated with a plurality of properties used to communicate with the hardware device;
scanning for available hardware devices, wherein
two or more of the available hardware devices each respond to different commands, and
a response to a given one of the commands identifies one of the available hardware devices, and the given one of the commands is user-defined;
creating an additional hardware object for each hardware device detected and not already associated with a hardware object;
providing a first hardware object, where the first hardware object:
is accessible to the computer,
is depicted in the graphical interface, and
interacts with the hardware device;
providing a first configuration of the hardware device represented by the first hardware object, the first configuration representing a collection of properties used to communicate with the hardware device and a first collection of values associated with the properties;
providing a second hardware object, where the second hardware object:
is accessible to the computer,
is depicted in the graphical interface, and
interacts with the hardware device;
providing a second configuration of the hardware device represented by the second hardware object, the second configuration representing the same collection of properties as the first configuration and a second collection of values associated with the properties, wherein at least one value of a property differs between the first configuration and the second configuration;
providing at least one software object, representative of the software device, where the software object is depicted in the graphical interface, and is configured to be interactive with the software device;
updating the graphical interface when the first hardware object, the second hardware object, or the software object are changed in the array-based environment; and
displaying the hardware object and the software object to a user.

28. The method of claim 27, further comprising:
receiving code for execution by the hardware object.

29. The method of claim 27, wherein at least one additional hardware object is provided for the hardware device.

30. The method of claim 27, wherein additional hardware objects are provided for a plurality of hardware devices.

31. The method of claim 27, further comprising:
providing an analysis object adapted to communicate with at least one of the hardware object and the software object.

32. The method of claim 27, wherein at least one of providing at least one hardware object and providing at least one software object further comprises accessing at least one of a hardware object and a software object located on a remote computer.

33. The method of claim 27, further comprising:
modifying at least one of the hardware object and the software object.

34. The method of claim 33, wherein modifying specifies a protocol for use by the hardware object for communication with the hardware device.

35. The method of claim 33, wherein modifying modifies a value stored in an array of an array-based environment.

36. The method of claim 27, further comprising generating an analysis object that can be used in MATLAB.

37. The method of claim 27, further comprising generating an analysis object that can be used in SIMULINK.

38. The method of claim 27, wherein the hardware object enables communication between the graphical interface and the hardware device, and the software object enables communication between the graphical interface and the software device.

39. A computing device comprising:
an array-based environment;
a storage medium for storing and a processor for processing:
- a graphical interface, at least one hardware device and one software device being accessible through the graphical interface, the hardware device associated with a plurality of properties used to communicate with the hardware device;
- instructions for scanning for available hardware devices, wherein
  - two or more of the available hardware devices each respond to different commands, and
  - a response to a given one of the commands identifies one of the available hardware devices, and the given one of the commands is user-defined;
- instructions for creating an additional hardware object for each hardware device detected and not already associated with a hardware object;
a first hardware object, where the first hardware object:
is accessible to the computer,
is depicted in the graphical interface, and
interacts with the hardware device;
a first configuration of the hardware device represented by the first hardware object, the first configuration representing a collection of properties used to communicate with the hardware device and a first collection of values associated with the properties;
a second hardware object, where the second hardware object:
is accessible to the computer,
is depicted in the graphical interface, and
interacts with the hardware device;
a second configuration of the hardware device represented by the second hardware object, the second configuration representing the same collection of properties as the first configuration and a second collection of values associated with the properties, wherein at least one value of a property differs between the first configuration and the second configuration;
a plurality of software objects, each representative of a software device accessible to the computer, where each of the software objects is depicted in the graphical interface and is configured to be interactive with the software device; and
a display device to display the first hardware object, the second hardware object, and the plurality of software objects to a user in a single graphical interface simultaneously, wherein the first hardware object, the second hardware object, and the plurality of software objects are accessible through both the array-based environment and the graphical interface.

40. The computing device of claim 39, wherein the system receives code for execution by the hardware objects.

41. The computing device of claim 39, wherein a plurality of hardware objects are provided for a single hardware device.

42. The computing device of claim 39, wherein a plurality of hardware objects are provided for a plurality of hardware devices.

43. The computing device of claim 39, wherein an analysis object is provided for communicating with at least one of the hardware objects and the software objects.

44. The computing device of claim 39, wherein at least one of the hardware objects and the software objects are located on a remote computer.

45. The computing device of claim 39, at least one of the hardware objects and the software objects are modified by the processor.

46. The computing device of claim 39, wherein at least one of the hardware objects and the software objects are modified by the processor such that a protocol is specified for use by the at least one of the hardware objects for communication with the hardware device.

47. The computing device of claim 39, wherein at least one of the hardware objects and the software objects are modified by the processor such that a value is stored in an array of an array-based environment.

48. The computing device of claim 39, wherein the hardware object enables communication between the graphical interface and the hardware device, and the software object enables communication between the graphical interface and the software device.

* * * * *